United States Patent
Mazur et al.

(10) Patent No.: US 10,352,237 B2
(45) Date of Patent: Jul. 16, 2019

(54) DIFFUSER HAVING SHAPED VANES

(71) Applicant: Rolls-Royce Corporation, Indianapolis, IN (US)

(72) Inventors: Steven A Mazur, Indianapolis, IN (US); Mark E Whitlock, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 554 days.

(21) Appl. No.: 15/165,282

(22) Filed: May 26, 2016

(65) Prior Publication Data

US 2017/0342847 A1 Nov. 30, 2017

(51) Int. Cl.
*F04D 29/44* (2006.01)
*F02C 7/04* (2006.01)

(52) U.S. Cl.
CPC .............. *F02C 7/04* (2013.01); *F04D 29/444* (2013.01); *F04D 29/441* (2013.01); *F05D 2230/237* (2013.01); *F05D 2230/60* (2013.01); *F05D 2240/123* (2013.01); *F05D 2240/124* (2013.01); *F05D 2250/52* (2013.01); *F05D 2250/712* (2013.01)

(58) Field of Classification Search
CPC ...... F04D 29/44; F04D 29/444; F04D 29/441; F04D 29/464
See application file for complete search history.

(56) References Cited

U.S. PATENT DOCUMENTS

| | | |
|---|---|---|
| 3,706,510 A | 12/1972 | O'Connor |
| 3,768,919 A | 10/1973 | O'Connor |
| 3,964,837 A | 6/1976 | Exley |
| 4,576,550 A | 3/1986 | Bryans |
| 5,252,027 A * | 10/1993 | Brasz ............... F04D 29/444 415/224.5 |
| 5,266,002 A | 11/1993 | Brasz |
| 5,445,496 A | 8/1995 | Brasz |

(Continued)

FOREIGN PATENT DOCUMENTS

| | | | |
|---|---|---|---|
| FR | 2958346 A1 * | 10/2011 | ........... F04D 17/122 |
| JP | WO 2016047256 A1 * | 3/2016 | ........... F04D 17/122 |

OTHER PUBLICATIONS

FR 2958346—Translation and Original.*

(Continued)

*Primary Examiner* — Justin D Seabe
*Assistant Examiner* — Behnoush Haghighian
(74) *Attorney, Agent, or Firm* — Brinks Gilson & Lione

(57) ABSTRACT

A radial diffuser and method for manufacturing a radial diffuser is provided, where the diffuser includes a vane positioned between a hub and a case. The hub includes a surface. The vane projects from the surface of the hub and is wedge-shaped. The vane includes a leading end extending toward a radial inner edge of the hub, a trailing end extending toward a radial outer edge of the hub, an upper surface, first and second sides extending longitudinally along the vane, and a middle region disposed between the hub and the upper surface. The vane at the upper surface has a thickness defined by a first wedge angle at the upper surface. The vane at the middle region has a thickness defined by a second wedge angle at the middle region. The second wedge angle is smaller than the first wedge angle.

20 Claims, 7 Drawing Sheets

(56) References Cited

U.S. PATENT DOCUMENTS

| | | | |
|---|---|---|---|
| 5,807,071 A | 9/1998 | Brasz et al. | |
| 6,589,015 B1* | 7/2003 | Roberts | F01D 9/045 |
| | | | 415/208.3 |
| 7,174,716 B2* | 2/2007 | Brasz | F01D 15/10 |
| | | | 415/202 |
| 7,281,379 B2* | 10/2007 | Brasz | F01D 5/048 |
| | | | 415/203 |
| 7,955,051 B2 | 6/2011 | Daguenet et al. | |
| 8,585,348 B2 | 11/2013 | Lin et al. | |
| 8,616,836 B2* | 12/2013 | Blair | F04D 29/444 |
| | | | 415/148 |
| 9,222,485 B2* | 12/2015 | Brown | F04D 29/448 |
| 2005/0163610 A1* | 7/2005 | Higashimori | F04D 29/444 |
| | | | 415/191 |
| 2018/0156059 A1* | 6/2018 | Toni | F01D 5/043 |

OTHER PUBLICATIONS

WO 2016047256—Translation and Original.*
Robert Kunte et al., "Experimental Investigation of a Truncated Pipe Diffuser with a Tandem Deswirler in a Centrifugal Compressor Stage", Journal of Turbomachinery, May 2013, vol. 135, 10 pgs.

* cited by examiner

DIFFUSER HAVING SHAPED VANES

TECHNICAL FIELD

This disclosure relates to diffusers for supplying air to combustors in turbine engines and, in particular, to vanes of diffusers.

BACKGROUND

The statements in this section merely provide background information related to the present disclosure and may not constitute prior art. In a gas turbine engine, a radial diffuser delivers air from the compressor to the combustor. In some examples, the diffuser slows high velocity air passing from an impeller to the combustor.

SUMMARY

Further areas of applicability will become apparent from the description provided herein. It should be understood that the description and specific examples are intended for purposes of illustration only and are not intended to limit the scope of the present disclosure.

In one embodiment, a radial diffuser system is provided including a plurality of vanes positioned between a hub and a case. Each respective vane is wedge-shaped and includes a leading end that extends toward a radial inner edge of the hub, a trailing end that extends toward a radial outer edge of the hub, a first side that extends longitudinally along the vane, and a second side that extends longitudinally along the vane opposite of the first side. At the case, the vane has a thickness defined by a first wedge angle. The first wedge angle is defined by the first side of the vane at the case and the second side of the vane at the case. A region of the vane arranged between the hub and the case has a thickness defined by a second wedge angle. The second wedge angle is defined by the first side of the vane at the region and the second side of the vane at the region. The first wedge angle is larger than the second wedge angle. The first side of the vane at the leading end is straight.

In another embodiment, a radial diffuser is provided including a vane and one of a hub and a case. The one of the hub and the vane includes a first surface, a radial inner edge, and a radial outer edge. The vane projects from the first surface and is wedge-shaped. The vane includes a leading end extending toward the radial inner edge of the hub, a trailing end extending toward the radial outer edge of the hub, an upper surface configured to receive a second surface of the other of the case and the hub, a first side extending longitudinally along the vane, a second side extending longitudinally along the vane opposite of the first side, and a middle region disposed between the first surface and the upper surface. The vane at the upper surface has a thickness defined by a first wedge angle the first wedge angle being defined by the first side of the vane at the upper surface and the second side of the vane at the upper surface. The vane at the middle region has a thickness defined by a second wedge angle the second wedge angle being defined by the first side of the vane at the middle region and the second side of the vane at the middle region. The second wedge angle is smaller than the first wedge angle.

In yet another embodiment, a method of manufacturing a radial diffuser is provided including providing a vane and forming the vane. The vane projects from a first surface of one of a hub and a case. The first surface has a radial inner edge and a radial outer edge. The vane is wedge-shaped. The vane includes a leading end extending toward the radial inner edge, a trailing end extending toward the radial outer edge, an upper surface, a first side extending longitudinally along the vane, and a second side extending longitudinally along the vane opposite of the first side. The vane is formed such that the vane at the upper surface has a thickness defined by a first wedge angle, the first wedge angle being defined by the first side of the vane at the upper surface and the second side of the vane at the upper surface. Additionally, the vane is formed such that a region of the vane arranged between the hub and the first surface of the vane has a thickness defined by a second wedge angle, the second wedge angle being defined by the first side of the vane at the region and the second side of the vane at the region. The first wedge angle is larger than the second wedge angle.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In one example, a diffuser system is provided comprising multiple vanes positioned between a hub and a case. Each of the vanes has a leading end extending toward a radial inner edge of the hub, a trailing end extending toward the radial outer edge of the hub, a first side that extends longitudinally along the vane, and a second side that extends longitudinally along the vane opposite of the first side. The vane at the case has a thickness defined by a first wedge angle, where the first wedge angle is formed between the first side of the vane at the case and the second side of the vane at the case. Additionally, a region of the vane arranged between the hub and the case has a thickness defined by a second wedge angle, where the second wedge angle is formed between the first side of the vane at the region and the second side of the vane at the region. The first wedge angle is larger than the second wedge angle, and the first side of the vane at the leading end is flat.

One technical advantage of the systems and methods described below may be that air passing through a diffuser may be delivered to a combustor at a target pressure and target Mach number to optimize the efficiency of combustion. Another technical advantage of the systems and method described below may be that air passing through the diffuser is less likely to experience separation or flow reversal.

Figure 1:
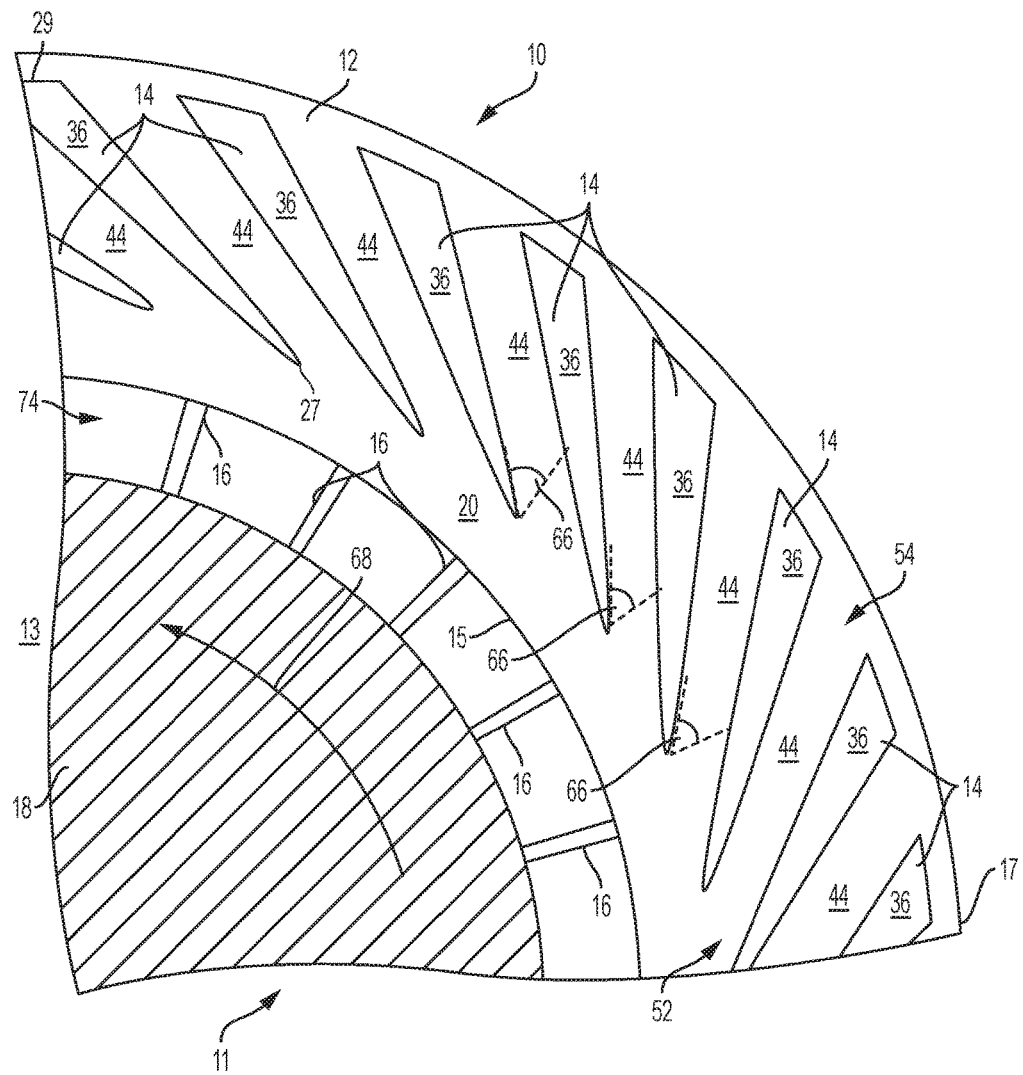
FIG. 1 illustrates a partial cross-sectional axial view of a first example of a gas turbine engine including compressor and a diffuser.

FIG. 1 illustrates a partial cross-sectional axial view of a gas turbine engine 13 including a radial diffuser 10 system. The radial diffuser 10 system may be any system configured to receive fluid flow from an impeller 74. The radial diffuser 10 system may include a hub 12 and multiple vanes 14 positioned about the circumference of the hub 12. In some embodiments, the radial diffuser 10 system may include only a vane 14. In some embodiments, the radial diffuser 10 system may be a component of a gas turbine engine 13 which may also include a compressor 11 and a combustor 48. The diffuser 10 may be any object configured to receive fluid flow from the impeller 74. Examples of a diffuser 10 may include a vane diffuser and a pipe diffuser. Fluid traveling through the diffuser 10 may slow in velocity and increase in static pressure. The diffuser 10 may be spaced radially outward from the impeller 74 or may be longitudinally positioned between the compressor 11 and the combustor 48.

The compressor 11 may be any component of a gas turbine engine 13 which mechanically increases the energy of a fluid passing through it. The compressor 11 may include the impeller 74, a plurality of blades 16, and a rotor 18. The impeller 74 may be any component of the compressor 11 which allows fluid communication of fluid through compressor 11. The rotor 18 may be any component of the compressor which is coupled to the shaft of the gas turbine engine 13 and drives the blades 16 of the impeller 74. Examples of a compressor 11 may include an axial compressor and a centrifugal compressor. The impeller 74 may increase the total pressure of fluid passing through the compressor 11. An outlet of the impeller 74 may be in fluid communication with the diffuser 10.

The hub 12 may be any part of the diffuser 10 which is positioned on the inner most flow path of the diffuser 10. In some embodiments, such as an axial diffuser, the inner most flow path may be the flow path which is closest to the longitudinal centerline of the gas turbine engine 13. In other embodiments, such as a radial diffuser, the inner most flow path may be the flow path which is closest to the combustor 48. In other embodiments, the inner most flow path may not be the flow path which is closest to either the combustor 48 or the longitudinal centerline of the gas turbine engine 13. Examples of the hub 12 may include a cylindrical ring positioned about the rotor 18 and a block having channels configured to receive fluid from the impeller 74. The hub 12 may have a surface 20 which is the inner most flow path of the fluid a diffuser inlet 52 at a radial inner edge 15 to a diffuser outlet 54 at a radial outer edge 17. The surface 20 of the hub 12 may be flat, curved, or bent. The hub 12 may be made from any material sufficiently rigid to withstand the mechanical stresses involved in operation of the gas turbine engine 13, such as stainless steel or titanium.

The vanes 14 may be any object which is positioned on the surface 20 of the hub 12 and configured to direct the flow of fluid passing through the diffuser 10. Examples of the vanes 14 may include wedges, airfoils, slats, and strips. Each of the vanes 14 has a leading end 26 extending toward the radial inner edge 15 of the hub 12 and a trailing end 28 extending toward the radial outer edge 17 of the hub 12. Each of the vanes 14 may also include a leading edge 27 extending in a leading direction beyond the leading end 26. Each of the vanes 14 may also include a trailing edge 29 extending in a trailing direction beyond the trailing end 26. The vanes 14 may be arranged within the hub 12 at an angular offset 66 from the radially outward direction to accommodate the direction of flow of the fluid exiting the compressor 11 and to reduce separation and flow reversal. The angular offset 66 of the vanes 14 may be dependent on the configuration of the compressor 11, but may vary between 60 and 85 degrees. The vanes 14 may be made from any material sufficiently rigid to withstand the mechanical stresses involved in operation of the gas turbine engine 13, such as stainless steel or titanium.

The leading edge 27 of each of the vanes 14 may be a rounded tip to reduce total pressure loss of fluid flowing through the diffuser 10. The trailing edge 29 of each of the vanes 14 may be flat or rounded as appropriate to reduce total pressure loss of fluid flowing through the diffuser 10. In some embodiments, the trailing end 28 may be positioned approximately halfway along the length of the vane 14. In such embodiments, sides (32, 34 in FIG. 4) of the vane 14 may come to a point at the trailing edge 29 of the vane such that the vane 14 has an airfoil shape.

Channels 44 may be defined on the surface 20 of the hub 12 between each of the vanes 14. The channels 44 may be any conduit through which fluid from the compressor 11 may pass from the diffuser inlet 52 to the diffuser outlet 54. Examples of channels 44 may include pipes, rectangular passageways, and other shaped passageways.

Figure 2:
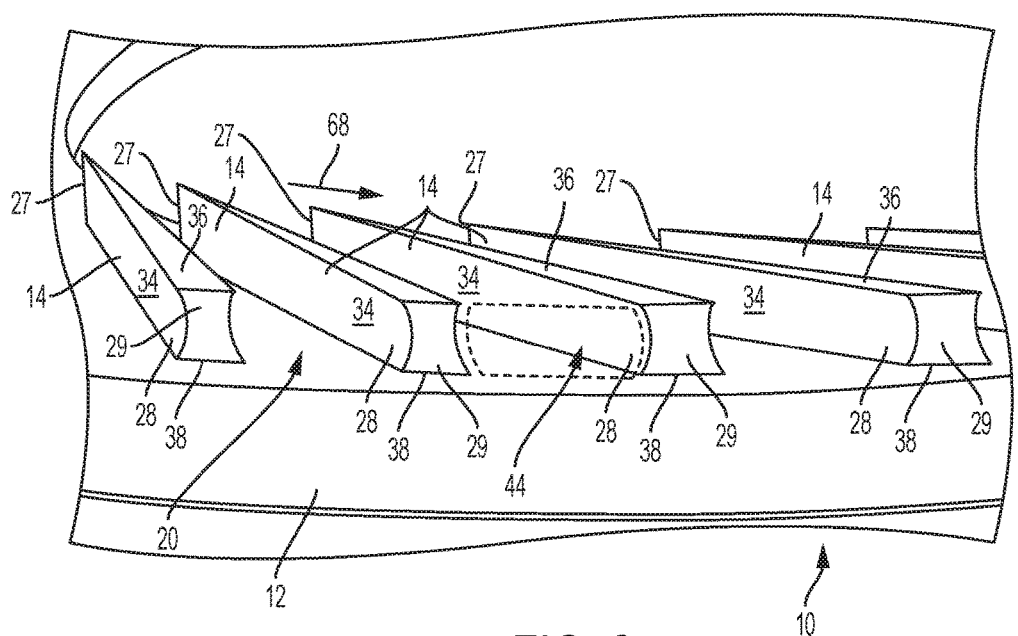
FIG. 2 illustrates a perspective view of a second example of a diffuser.

FIG. 2 illustrates a perspective view of a second example of the diffuser 10 including multiple vanes 14. Each of the vanes 14 includes a suction side (32 in FIG. 4) and a pressure side 34. As the air exits from the impeller 74, the flow of the air may have angular momentum in the direction of the impeller's 74 rotation 68. The pressure side 34 of the vane 14 may be the side of the vane 14 that faces the direction of the impeller's 74 rotation 68. The suction side 32 of the vane 14 may be the side of the vane 14 which opposes the pressure side 34 and faces away from the direction of the impeller's 74 rotation 68. Where the vanes 14 are exactly aligned with the fluid flow from the compressor 11, there may be no distinction between the pressure side 34 and the suction side 32.

Each of the vanes 14 may also comprise an upper surface 36 and a base 38 on opposing sides of the vane 14. The base 38 may be co-planar with and in contact with the surface 20 of the hub 12. The upper surface 36 may be on an opposing side from the base 38. The upper surface 36 may be flat. The upper surfaces 36 of the multiple vanes 14 may be co-planar and configured to receive a surface (72 in FIG. 5) of a case (70 in FIG. 5). The case 70 may be screwed, bolted, welded, friction-fit, or brazed to the upper surface 36 of the hub 12. In some embodiments, the vanes 14 may be formed from a surface 72 of the case 70, and the base 38 of the vanes 14 may be screwed, bolted, welded, friction-fit, or brazed to the surface 20 of the hub 12.

The channels 44 between the vanes 14 may be defined by the surface 20 of the hub 12 defining the bottom of the channels 44, the pressure side 34 of one of the vanes 14 and the suction side 32 of an adjacent vane 14 defining the sides of the channels 44, and the surface 72 of the case 70 defining the top of the channels 44. The top and bottom of the channels 44 may be flat, curved, or bent. The channels 44 may each have a cross-sectional area which increases from the leading end 26 of the vanes 14 to the trailing end 28 of the vanes 14. A ratio of the cross-sectional area of each of the channels 44 at the leading end 26 to the cross-sectional area of each of the channels 44 at the trailing end 28 may be between 1 and 4.

The pressure side 34 and suction side 32 of each of the vanes 14 may have an inwardly curved surface between the base 38 and the upper surface 36. The curvature of this curved surface may vary longitudinally from the leading end 26 to the trailing end 28 of the vane 14. In some embodiments, the leading end 26 of the vane 14 may be straight. The leading end 26 may be arranged vertically or arranged at a slanted angle.

Figure 3:
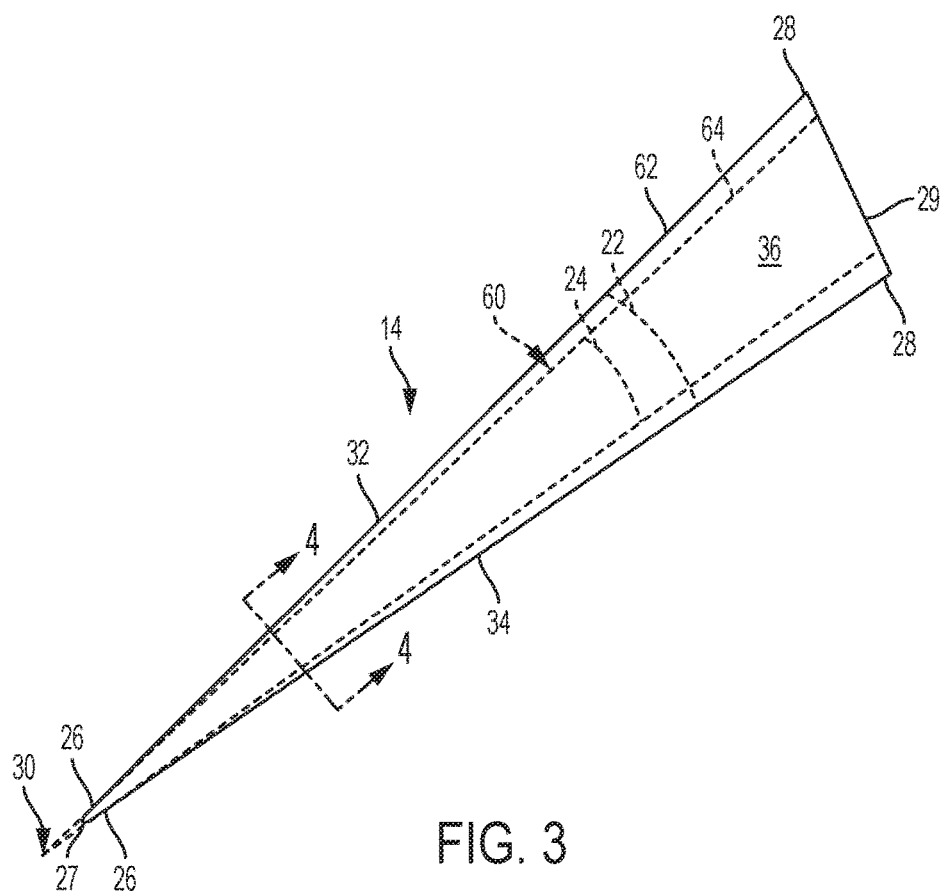
FIG. 3 illustrates a partial cross-sectional top-down view of an example of a vane.

FIG. 3 illustrates a partial cross-sectional top-down view of an example of the vane 14. The vane 14 may be wedge-shaped, extending from a vertex 30. In some embodiments, the pressure side 34 and the suction side 32 may meet at the vertex 30 at the leading edge 27. However, in other embodiments the leading edge 27 may be a rounded tip, and the pressure side 34 and suction side 32 may only extend longitudinally toward the vertex 30 without reaching the vertex 30.

The vertical profiles of the pressure side 34 and suction side 32 may be formed by the vane 14 having a variable wedge angle 22, 24 which changes with respect to height from the surface 20 of the hub 12. The thickness (56, 58 in FIG. 4) of the vane 14 may increase longitudinally from the leading end 26 to the trailing end 28, however, the thickness 56, 58 of the vane 14 at any longitudinal point is defined by the wedge angle 22, 24. In the embodiment shown in FIG. 3, the vane 14 may have a thickness 56 at the upper surface 36 of the vane 14 defined by a first wedge angle 22. The first wedge angle 22 may be defined by the pressure side 34 and suction side 32 of the vane 14 at the upper surface 36 of the vane 14, where the vane 14 may be configured to receive the surface 72 of the case 70. The first wedge angle 22 may be between 0 degrees and 12 degrees. In some embodiments, the vane may have identical thicknesses 56 defined by the first wedge angle 22 at both the upper surface 36 and the base 38 of the vane 14.

The vane 14 may have a different thickness 58 at a region 60 of the vane 14 arranged between the base 38, where the vane 14 meets the surface 20 of the hub 12, and the upper surface 36, defined by a second wedge angle 24. The second wedge angle 24 may be defined by the pressure side 34 and suction side 32 of the vane 14 at the region between the base 38 and the upper surface 36 of the vane 14. The second wedge angle 24 may be smaller than the first wedge angle 22. The region 60 may be at the midpoint between the base 38 and the upper surface 36 of the vane 14. The region 60 may be located at the position between the base 38 and the upper surface 36 where the thickness 58 of the vane 14 is smallest at any given longitudinal point between the leading end 26 and the trailing end 28. In some embodiments, the vane 14 may have multiple regions 60 between the base 38 and the upper surface 36, resulting in multiple second wedge angles 24 and multiple thicknesses 58. In some embodiments, the first wedge angle 22 and the second wedge angle 24 may share the same vertex 30. The vertices 30 of the first wedge angle 22 and the second wedge angle 24 may be aligned along a vertical line which is perpendicular to a plane containing the surface 20 of the hub 12. The vertical line containing the overlapping vertices 30 may also be perpendicular to the surface 72 of the case 70. In this embodiment, the leading end 26 of the pressure side 34 or of the suction side 32 may be straight or have an inward curvature. However, in other embodiments, the first wedge angle 22 and second wedge 24 may have vertices 30 which are offset from one another. In some embodiments, the vertices of the first wedge angle 22 and the second wedge angle 24 may be aligned along a longitudinal line extending between the leading edge 27 and the trailing edge 29 of the vane 14. In some embodiments, the vertices of the first wedge angle 22 and the second wedge angle 24 may not overlap. The second wedge angle 24 may be between 0 degrees and 12 degrees.

In some embodiments, the vane 14 may include a plurality of wedge angles including the first and second wedge angles 22, 24. These wedge angles may be spaced along the height of the vane 14 to form a more gradual angular transition between the minimum thickness 58 and maximum thickness 56 of the vane 14. In some embodiments the plurality of wedge angles may be defined by a continuous function such that smooth inwardly curving surfaces are formed by the plurality of wedge angles on the pressure side 34 and suction side 32 of the vane.

Figure 4:
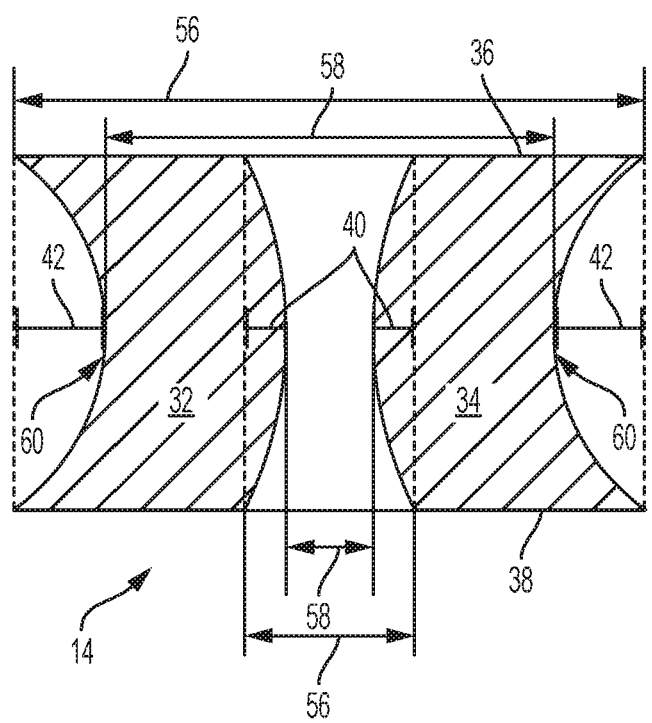
FIG. 4 illustrates a radially-outward cross-sectional front view of the vane shown in FIG. 3.

FIG. 4 illustrates a cross sectional view of the example of the vane 14 illustrated in FIG. 3, taken at the cross-sectional line 4-4. The pressure side 34 and suction side 32 of the vane 14 may have inwardly curved surfaces to meet the change between the thickness 56 of the vane 14 defined by the first wedge angle 22 at the upper surface 36 and the thickness 58 of the vane 14 defined by the second wedge angle 24 at the region 60. The inwardly curved surface may have a curve depth 40, 42 defined as the difference between the thickness 56 at the upper surface 36 and the thickness 58 at the region 60 having the minimum thickness. The curve depth 40, 42 may vary longitudinally from the leading end 26 to the trailing end 28. Portions of the pressure side 34 and suction side 32 located closer to the leading end 28 may have a smaller curve depth 40 than the curve depth 42 of portions of the pressure side 34 and suction side 32 located closer to the trailing end 28.

Figure 5:
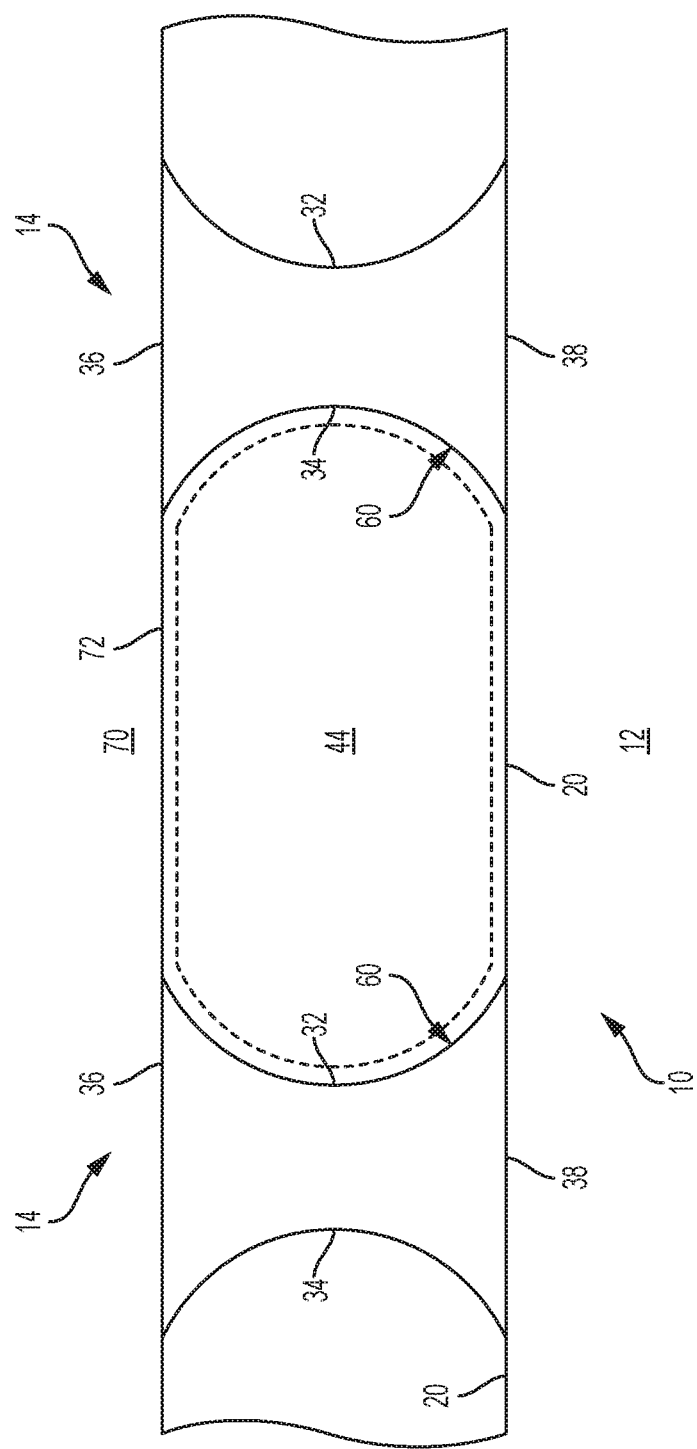
FIG. 5 illustrates a radially-inward cross-sectional view of a third example of a diffuser including a hub and two vanes.

FIG. 5 illustrates a partial cross-sectional view of a third example of the diffuser 10 including the hub 12, the case 70, two vanes 14, and the channel 44. The channel 44 may have additional cross-sectional area in the vicinity of the region 60 of each of the vanes 14 as a result of the inwardly curved surfaces on the pressure sides 34 and the suction sides 32 of the vanes 14. The inwardly curved surfaces may reduce total pressure loss of fluid flowing through the channel 44. In some embodiments, the pressure sides 34 of the vanes 14 may be inwardly curved surfaces, while the suction sides 32 of the vanes 14 may be straight surfaces. The straight surface may be perpendicular to the surface 20 of the hub 12 or may be slanted at an angle. In other embodiments, the suction sides 32 of the vanes 14 may be inwardly curved surfaces, while the pressure sides 34 of the vanes 14 may be straight surfaces. In some embodiments one of the pressure sides 34 and suction sides 32 may be an inwardly curved surface, and the other of the pressure sides 34 and suction sides 32 may be an outwardly curved surface. The curve depth 40, 42 of the pressure side 34 may be symmetric with the curve depth 40, 42 of the suction side 32. In other embodiments, the curve depth 40, 42 of the pressure side 34 may be greater or less than the curve depth 40, 42 of the suction side 32.

The case 70 may be any part of the diffuser 10 which is positioned on the outer most flow path of the diffuser 10. In some embodiments, such as an axial diffuser, the outer most flow path is the flow path which is furthest from the longitudinal centerline of the gas turbine engine 13. In other embodiments, such as a radial diffuser, the outer most flow path is the flow path which is furthest from the combustor 48. In other embodiments, the outer most flow path may not be the flow path which is closest to either the combustor 48 or the longitudinal centerline of the gas turbine engine 13, but is spaced apart from the inner most flow path of the diffuser 10. Examples of the case 70 may include a cylindrical ring or a block having channels configured to receive fluid from the impeller 74. The case 70 may have a surface 72 which is the outer most flow path of the fluid a diffuser inlet 52 at a radial inner edge 15 to a diffuser outlet 54 at a radial outer edge 17. The surface 72 of the case 70 may be flat, curved, or bent. The case 70 may be made from any material sufficiently rigid to withstand the mechanical stresses involved in operation of the gas turbine engine 13, such as stainless steel or titanium.

Figure 6:
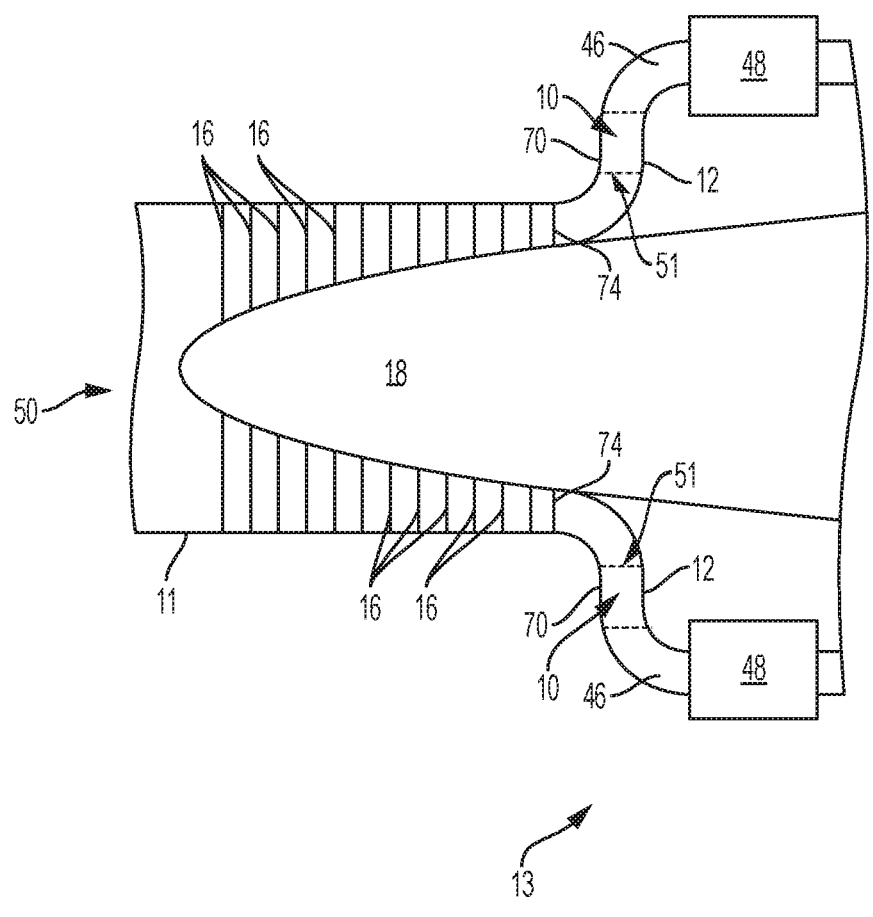
FIG. 6 illustrates a partial cross-sectional side view of a second example of a gas turbine engine including a compressor, a diffuser, a deswirler, and a combustor.

The embodiments of the vanes 14 and diffusers 12 illustrated in FIGS. 1-5 may be advantageous in some turbine engine systems. Referring to FIG. 6 a partial cross-sectional side view of a second embodiment of the gas turbine engine 13 is illustrated. The gas turbine engine 13 may include the compressor 11, a deswirler 46, and a combustor 48. The compressor 11 may include the rotor 18, the diffuser 10, and an impeller 74. A fluid such as air may be received in a compressor inlet 50. The fluid may then pass through the impeller 74 blades 16 in which the rotor 18 drives blades 16 to increase the total pressure of the fluid. After passing through the outlet 51 of the impeller 74, the fluid may enter the diffuser 10. While passing through the diffuser 10, the some of the kinetic energy of the fluid may be converted to static pressure such that the fluid exits the diffuser 10 at or near a target Mach number for efficient combustion. After exiting the diffuser 10, the fluid may enter the deswirler 46 which may direct the flow of the fluid into the combustor 48, where the energy of the fluid may be increased by combustion.

Furthermore, although specific components are described above, methods, systems, and articles of manufacture described herein may include additional, fewer, or different components. For example, the gas turbine engine 13 may not include a deswirler 46 or a compressor 11.

Figure 7:
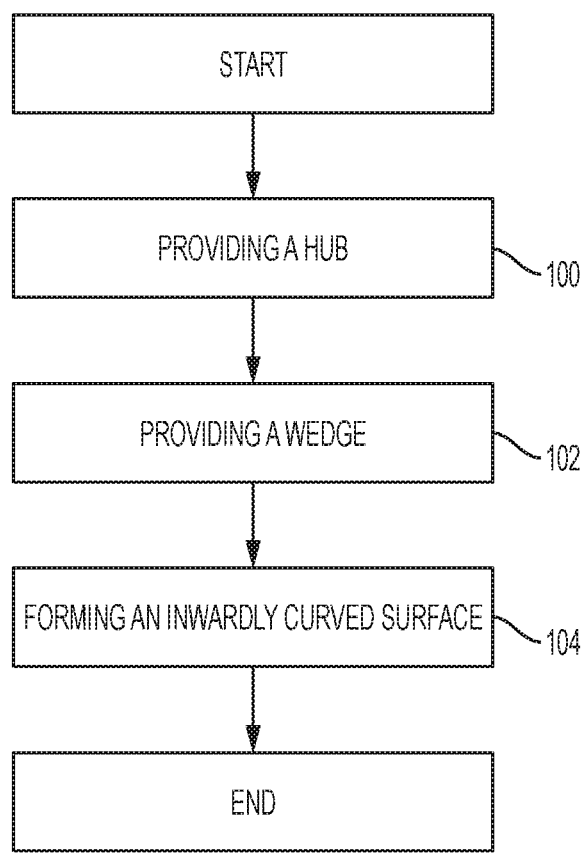
FIG. 7 illustrates a flow diagram of operations to manufacture the diffuser.

FIG. 7 illustrates a flow diagram of operations to manufacture the diffuser 10. The operations may include fewer, additional, or different operations than illustrated in FIG. 7. Alternatively or in addition, the operations may be performed in a different order than illustrated.

The diffuser 10 may be made in the following manufacturing process. The hub 12 may be provided (100) having the surface 20, the radial inner edge 15, and the radial outer edge 17. The vane 14 may also be provided (102) projecting from the hub 12. The vane 14 is wedge-shaped and includes the leading end 26, the trailing end 28, the upper surface 36, the base 38, the pressure side 34, and the suction side 32. Multiple vanes 14 may be arranged on the surface 20 of the hub 12. The upper surface 36 of the vane 14 may be configured to receive a case 70. The upper surface 36 of the vane 14 may be screwed, bolted, brazed, welded, friction-fit, or otherwise coupled to the surface 72 of the case 70. In some embodiments, the vanes 14 may be integrally formed from the flat surface 72 of the case 70. Similarly, the base 38 of the vane 14 may be screwed, bolted, brazed, welded, friction-fit, or otherwise coupled to the surface 20 of the hub 12. In some embodiments, the vanes 14 may be integrally formed from the surface 20 of the hub 12.

The vane 14 may be formed (104) such that the vane 14 at the upper surface 36 has the thickness 56 defined by the first wedge angle 22 and at the region 60 has the thickness 58 defined by the second wedge angle 24. The vane 14 may be formed (104) by grinding the pressure side 34 and suction side 32 of the vane 14, by forming the vane 14 (104) from a cast mold, or by another equivalent means. In other embodiments, the vanes 14 may be formed by machining or by electrical discharge machining (EDM).

In some embodiments the vane 14 may be formed by forming the inwardly curved surface on the pressure side 34 and suction side 32, according to a continuous curve function. The continuous curve function may be defined by fitting a curve between a plurality of wedge angles arranged between the upper surface 36 and the base 38 of the vane 14.

In addition to the advantages that have been described, it is also possible that there are still other advantages that are not currently recognized but which may become apparent at a later time. While various embodiments have been described, it will be apparent to those of ordinary skill in the art that many more embodiments and implementations are possible. Accordingly, the embodiments described herein are examples, not the only possible embodiments and implementations.

We claim:

1. A radial diffuser system comprising:
a plurality of vanes positioned between a hub and a case, each of the plurality of vanes having a wedge-shape and comprising a base coupled to the hub, an outer surface adjacent to the case, a leading end arranged proximate to a radial inner edge of the hub, a trailing end arranged proximate to a radial outer edge of the hub, a first side that extends longitudinally along each of the plurality of vanes, and a second side that extends longitudinally along each of the plurality of vanes opposite of the first side, wherein each of the plurality of vanes at the case has a thickness defined by a first wedge angle, the first wedge angle defined between the first side at the outer surface and the second side at the outer surface, wherein a region of each of the plurality of vanes is arranged between the base and the outer surface, the region having a thickness defined by a second wedge angle, the second wedge angle being defined between the first side at the region and the second side at the region, wherein the first wedge angle is larger than the second wedge angle, and wherein the first side of the vane at the leading end is a straight line.

2. The radial diffuser system of claim 1, wherein a channel is defined by the first side of a first vane of the plurality of vanes, the second side of a second vane of the plurality of vanes, and a surface of the hub.

3. The radial diffuser system of claim 2, wherein the surface of the hub is flat.

4. The radial diffuser system of claim 1, wherein the first side of each of the plurality of vanes is arranged on a pressure side of each of the plurality of vanes and the second side of each of the plurality of vanes is arranged on a suction side of each of the plurality of vanes.

5. The radial diffuser system of claim 4, wherein the first side and the second side each comprise an inwardly curved surface extending between the surface of the hub and the case.

6. The radial diffuser system of claim 4, wherein the first side comprises an inwardly curved surface extending between the base and the outer surface, and wherein the second side comprises a straight surface.

7. The radial diffuser system of claim 6, wherein the straight surface of the second side is perpendicular to a surface of the hub.

8. The radial diffuser system of claim 1, wherein the thickness of the region between the base and the outer surface of each of the plurality of vanes varies according to a continuous function of a distance of a location within the region from the outer surface.

9. A radial diffuser comprising:
one of a hub and a case having a first surface, a radial inner edge, and a radial outer edge; and a vane projecting from the first surface, the vane being wedge-shaped and comprising a leading end arranged proximate to the radial inner edge, a trailing end arranged proximate to the radial outer edge, a first side that extends longitudinally along the vane, a second side that extends longitudinally along the vane opposite of the first side, a base coupled to the first surface of the hub, an upper surface configured to receive a second surface of the other of the hub and the case, and a middle region disposed between the base and the upper surface, wherein the vane at the upper surface has a first thickness defined by a first wedge angle, the first wedge angle being defined between the first side at the upper surface and the second side at the upper surface, and wherein the vane at the middle region has a second thickness defined by a second wedge angle, the second wedge angle being defined between the first side at the middle region and the second side at the middle region, and wherein the second wedge angle of the middle region is smaller than the first wedge angle.

10. The radial diffuser of claim 9, wherein the first side extends between the base and the upper surface of the vane, the first side having an inwardly curved surface, extending from the leading end to the trailing end.

11. The radial diffuser of claim 10, wherein the inwardly curved surface has a curve depth which is shallowest at the leading end and deepest at the trailing end.

12. The radial diffuser of claim 9, wherein the vane at the base has a third thickness defined by a third wedge angle which is larger than the second wedge angle.

13. The radial diffuser of claim 12, wherein the third thickness of the vane at the base is equal to the first thickness of the vane at the upper surface.

14. The radial diffuser of claim 9, wherein the vane comprises a rounded leading edge.

15. The radial diffuser of claim 9, wherein the first side of the vane at the leading end is a straight line.

16. The radial diffuser of claim 9, comprising a plurality of vanes projecting from the first surface, the plurality of vanes including the vane.

17. A method of manufacturing a radial diffuser comprising:
providing a vane projecting from a first surface of one of a hub or a case, the first surface having a radial inner edge, and a radial outer edge, the vane being wedge-shaped and comprising a leading end arranged proximate to the radial inner edge, a trailing end arranged proximate to the radial outer edge, an upper surface, a base coupled to the first surface, a first side extending longitudinally along the vane, and a second side extending longitudinally along the vane opposite of the first side; and
forming the vane such that the vane at the upper surface has a first thickness defined by a first wedge angle, the first wedge angle being defined between the first side of the vane at the upper surface and the second side of the vane at the upper surface, that a region of the vane arranged between the base and the upper surface of the vane has a second thickness defined by a second wedge angle, the second wedge angle being defined between the first side of the vane at the region and the second side of the vane at the region, and wherein the first wedge angle is larger than the second wedge angle.

18. The method of claim 17, wherein the base of the vane is brazed to the first surface.

19. The method of claim 17, wherein the vane is integrally formed from the hub.

20. The method of claim 17, further comprising coupling the upper surface of the vane to a second surface of the other of the hub or the case.

* * * * *